US012064069B2

(12) United States Patent
Jung et al.

(10) Patent No.: US 12,064,069 B2
(45) Date of Patent: Aug. 20, 2024

(54) ROBOT CLEANER AND METHOD FOR CONTROLLING SAME

(71) Applicant: EVERYBOT INC., Seongnam-si (KR)

(72) Inventors: Woo Chul Jung, Hwaseong-si (KR); Bong Yun Kim, Anyang-si (KR)

(73) Assignee: EVERYBOT INC., Seongnam-si (KR)

( * ) Notice: Subject to any disclaimer, the term of this patent is extended or adjusted under 35 U.S.C. 154(b) by 807 days.

(21) Appl. No.: 17/041,962

(22) PCT Filed: Mar. 26, 2019

(86) PCT No.: PCT/KR2019/003493
§ 371 (c)(1),
(2) Date: Sep. 25, 2020

(87) PCT Pub. No.: WO2019/190160
PCT Pub. Date: Oct. 3, 2019

(65) Prior Publication Data
US 2021/0113048 A1    Apr. 22, 2021

(30) Foreign Application Priority Data

Mar. 26, 2018  (KR) ........................ 10-2018-0034524

(51) Int. Cl.
A47L 11/40 (2006.01)
B25J 11/00 (2006.01)
B25J 9/16 (2006.01)

(52) U.S. Cl.
CPC ........ *A47L 11/4011* (2013.01); *B25J 11/0085* (2013.01); *A47L 11/4061* (2013.01);
(Continued)

(58) Field of Classification Search
None
See application file for complete search history.

(56) References Cited

U.S. PATENT DOCUMENTS 6,208,105 B1    3/2001 Kato et al.

FOREIGN PATENT DOCUMENTS

| CN | 1928745 A | 3/2007 |
|---|---|---|
| CN | 107278132 A | 10/2017 |

(Continued)

OTHER PUBLICATIONS

Google Patents translation of CN107278132A (Year: 2023).*
Google Patents translation of CN1928745A (Year: 2023).*

*Primary Examiner* — Eric W Golightly
(74) *Attorney, Agent, or Firm* — Bridgeway IP Law Group, PLLC; Sang Ho Lee; Hyun Woo Shin

(57) ABSTRACT

Provided are a cleaning robot and a control method thereof. The control method of the cleaning robot including a first rotation member and a second rotation member each performing a rotational motion around a first rotation axis and a second rotation axis according to the present disclosure includes: obtaining acceleration of the cleaning robot and at least one of rotational loads and rotational speeds of the respective first and second rotation members, during driving of the cleaning robot; determining whether the obtained acceleration is abnormal and whether at least one of the obtained rotational loads or at least one of the obtained rotational speeds is abnormal; and determining that an obstacle is detected when the acceleration is determined to be abnormal and at least one of the rotational loads or at least one of the rotational speeds is determined to be abnormal.

13 Claims, 7 Drawing Sheets

(52) U.S. Cl.
CPC ....... *A47L 2201/04* (2013.01); *A47L 2201/06* (2013.01); *B25J 9/1666* (2013.01)

(56) References Cited

FOREIGN PATENT DOCUMENTS

| | | |
|---|---|---|
| JP | 2005-309657 A | 11/2005 |
| JP | 2007-334666 A | 12/2007 |
| KR | 10-2011-0090108 A | 8/2011 |
| KR | 10-2013-0002218 A | 1/2013 |
| KR | 10-2016-0090571 A | 8/2016 |
| KR | 10-1772084 B1 | 8/2017 |
| KR | 10-2018-0008250 A | 1/2018 |

* cited by examiner

ROBOT CLEANER AND METHOD FOR CONTROLLING SAME

TECHNICAL FIELD

The present disclosure relates to a cleaning robot and a control method thereof, and more particularly, to a cleaning robot capable of autonomously moving and performing a mop cleaning and the like, and a control method thereof.

BACKGROUND ART

Various devices have been automated in accordance with the development of industrial technology. As well known, a cleaning robot has been used as a device that automatically cleans a cleaning target area by sucking or wiping a foreign material such as dust from a to-be-cleaned surface while be autonomously driven within the cleaning target area without a user's operation.

In general, the cleaning robot may include a vacuum cleaner performing the cleaning using suction force by a power source such as electricity.

The cleaning robot including such a vacuum cleaner has a limitation in that the cleaning robot is not able to remove a foreign material or ingrained dirt, adhered to the to-be-cleaned surface. In recent years, there has thus emerged a cleaning robot having a mop attached thereto and capable of performing a wet mopping or a mop cleaning.

However, the mop cleaning method used by a general cleaning robot is just a simple method of attaching a mop or the like to a bottom portion of a conventional vacuum cleaning robot, and may thus fail to effectively remove the foreign material and efficiently perform the mop cleaning.

In addition, the mop cleaning method used by the general cleaning robot allows the cleaning robot to be driven using methods of moving, avoiding an obstacle and the like used by a conventional suction type vacuum cleaner as they are, and may thus remove the dust and the like scattered on the to-be-cleaned surface, but may not easily remove the foreign material and the like adhered to the to-be-cleaned surface.

In particular, a function of the cleaning robot to detect and avoid the obstacle during its driving may be an important function influencing its durability and cleaning quality. The conventional cleaning robot may require an expensive image capture device or a bumper separately provided to detect the obstacle or collision, which may cause increases in cost and failure rate due to the increased number of components.

DISCLOSURE

Technical Problem

An object of the present disclosure is to provide a cleaning robot capable of detecting an obstacle without having any separate obstacle detection means such as an image capture device or a bumper, and a control method thereof, the cleaning robot having a structure in which a mop is attached thereto to effectively remove a foreign material and the like adhered to a to-be-cleaned surface and a rotational force itself of its rotation member is used as a motive power source thereof, for example.

Another object of the present disclosure is to provide a method of the cleaning robot to detect the obstacle by effectively combining acceleration of the cleaning robot with the rotational speed and rotational load of the rotation member, during its driving.

Still another object of the present disclosure is to provide a method of the cleaning robot to detect the obstacle with increased accuracy by reflecting an environment of the cleaning robot during its driving, such as a change in a state of a floor surface to be cleaned.

Yet still another object of the present disclosure is to provide a method of the cleaning robot to avoid an obstacle by avoiding the obstacle in an advantageous direction and restarting its driving for cleaning even after detecting the obstacle.

Technical Solution

According to an aspect of the present disclosure, there is provided a control method of a cleaning robot including a first rotation member and a second rotation member each performing a rotational motion around a first rotation axis and a second rotation axis, including: obtaining acceleration of the cleaning robot and at least one of respective rotational loads of the first and second rotation members or at least one of respective rotational speeds of the first and second rotation members, during driving of the cleaning robot; determining whether the obtained acceleration is abnormal and whether at least one of the obtained rotational loads or at least one of the obtained rotational speeds is abnormal; and determining that an obstacle is detected when the acceleration is determined to be abnormal and at least one of the rotational loads or at least one of the rotational speeds is determined to be abnormal.

In addition, the control method of a cleaning robot may further include performing obstacle avoidance driving of the cleaning robot when the obstacle is determined to be detected.

In addition, the determining of whether the acceleration is abnormal and the rotation members are abnormal may include determining whether the acceleration is abnormal by reflecting a driving environment of the cleaning robot.

In addition, in the determining of whether the acceleration is abnormal by reflecting the driving environment, the driving environment may be reflected based on a change in the acceleration of the cleaning robot during its driving.

In addition, in the determining of whether the acceleration is abnormal by reflecting the driving environment, the acceleration may be stored each time a predetermined time interval elapses during the driving of the cleaning robot, and the acceleration of the cleaning robot during its driving may be determined to be abnormal when the following deviation is greater than or equal to a predetermined first reference value: the deviation between the maximum and minimum values of the accelerations stored within a predetermined time period of the predetermined time interval or more, retroactively from a time point during the driving of the cleaning robot.

Meanwhile, each of the acceleration and the first reference value may be given by a vector having x, y and z components orthogonal in three directions, respectively, the vector components in the same direction matching each other, and whether the deviation between the maximum and minimum values of the acceleration is greater than or equal to the first reference value may be determined by whether at least one of respective vector components of the acceleration is greater than or equal to the matching vector component of the first reference value.

In addition, the control method of a cleaning robot may further include storing an average value of the deviation from a point in which the cleaning robot starts its driving to a point in which the cleaning robot is driven for a predetermined distance and setting a value greater than the average value as the first reference value, wherein in the determining of whether the acceleration is abnormal and the rotation members are abnormal, the acceleration may be determined to be abnormal only when a state in which the deviation is greater than or equal to the first reference value is maintained for a predetermined duration or longer after the cleaning robot is driven for the predetermined distance.

In the determining of whether the acceleration is abnormal and the rotation members are abnormal, the acceleration of the cleaning robot during its driving may be determined to be abnormal when the deviation is greater than or equal to a predetermined second reference value.

In addition, in the determining of whether the acceleration is abnormal and the rotation members are abnormal, the acceleration of the cleaning robot during its driving may be determined to be abnormal also when the acceleration is greater than or equal to a predetermined third reference value.

Meanwhile, the rotational loads of the rotation members may preferably be obtained based on the drive currents of the rotation members, respectively.

In the determining of whether the acceleration is abnormal and the rotation members are abnormal, the rotational speed less than a fourth reference value may be determined to be abnormal.

In addition, the determining of the obstacle detection may further include determining whether a difference between the rotational speeds of the first and second rotation members is greater than or equal to a predetermined fifth reference value and determining a position where the obstacle is detected based thereon.

In the determining of the position where the obstacle is detected, when the difference between the rotational speeds is greater than or equal to the fifth reference value, a position where a rotation member having a smaller rotational speed is located among the respective rotation members may be determined as the position where the obstacle is detected, and in the performing of the obstacle avoidance driving, the cleaning robot may restart its driving biased in a direction of the other rotation member not located at the position where the obstacle is detected among the rotation members based on a direction in which the cleaning robot is driven before the obstacle is detected.

Meanwhile, in the performing of the obstacle avoidance driving, when the difference between the rotational speeds is less than the fifth reference value, the cleaning robot may restart its driving in a direction opposite to a direction in which the cleaning robot is driven before the obstacle is detected.

Cleaners for wet cleaning may be fixed to the first rotation member and the second rotation member, respectively, and the cleaning robot may be driven using a frictional force as its motive power source, the frictional force being generated between a to-be-cleaned surface and each of the fixed cleaners as the each of the fixed cleaners performs the rotational motion.

According to another aspect of the present disclosure, there is provided a cleaning robot including: a first rotation member and a second rotation member each performing a rotational motion around a first rotation axis and a second rotation axis; an acceleration detection unit obtaining acceleration of the cleaning robot during its driving; at least one of a rotational load detection unit obtaining each rotational load of the rotation members and a rotational speed detection unit obtaining each rotational speed of the rotation members; and a control unit, wherein the control unit may determine whether the obtained acceleration is abnormal and whether at least one of the obtained rotational loads or at least one of the obtained rotational speeds is abnormal, and may determine that an obstacle is detected when the acceleration is determined to be abnormal and at least one of the rotational loads or at least one of the rotational speeds is determined to be abnormal.

When the obstacle is determined to be detected, the control unit may preferably allow the cleaning robot to perform obstacle avoidance driving.

The control unit may determine whether the acceleration is abnormal by reflecting a driving environment of the cleaning robot.

In addition, the control unit may reflect the driving environment based on a change in the acceleration of the cleaning robot during its driving.

In addition, the control unit may allow the acceleration to be stored each time a predetermined time interval elapses during the driving of the cleaning robot, and may determine that the acceleration of the cleaning robot during its driving is abnormal when the following deviation is greater than or equal to a predetermined first reference value: the deviation between the maximum and minimum values of the accelerations stored within a predetermined time period of the predetermined time interval or more, retroactively from a time point during the driving of the cleaning robot.

In addition, when the cleaning robot includes the rotational speed detection units, the control unit may determine that the rotational speed less than a fourth reference value is abnormal.

In addition, the control unit may determine whether a difference between the rotational speeds of the first and second rotation members is greater than or equal to a predetermined reference value of the difference between the rotational speeds and may determine a position where the obstacle is detected based thereon.

Advantageous Effects

According to the various embodiments of the present disclosure described above, the cleaning robot may detect the obstacle without having any separate obstacle detection means such as an image capture device or a bumper.

In addition, according to the various embodiments of the present disclosure, the cleaning robot may detect the obstacle by effectively combining the acceleration of the cleaning robot with the rotational speed and rotational load of the rotation member, during its driving.

In addition, according to the various embodiments of the present disclosure, the cleaning robot may detect the obstacle with the increased accuracy by reflecting the environment of the cleaning robot during its driving, such as a change in a state of the floor surface to be cleaned.

In addition, according to the various embodiments of the present disclosure, the cleaning robot may avoid the obstacle in an advantageous direction and restart its driving for the cleaning even after detecting the obstacle.

BEST MODE

Figure 1:
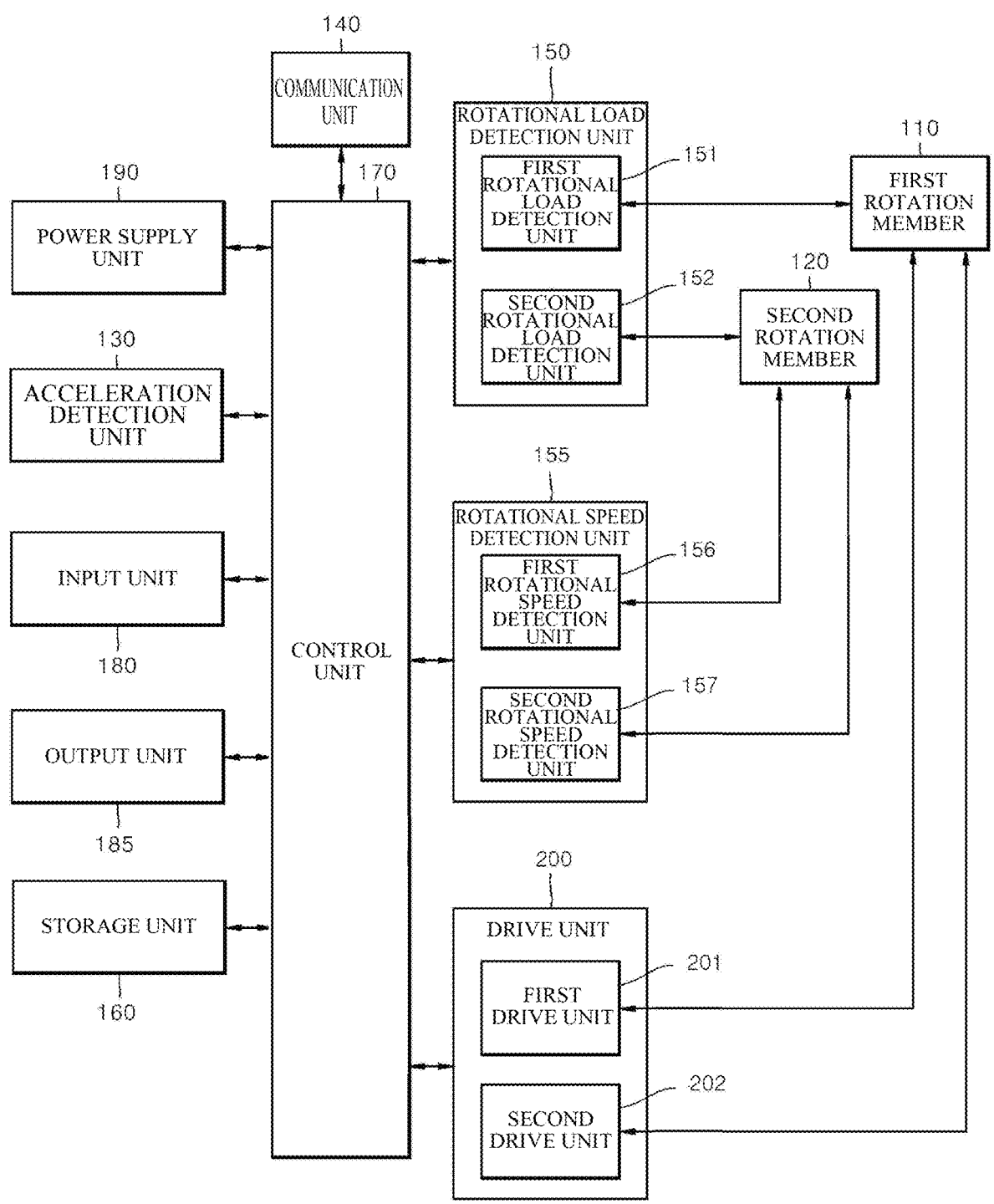
FIG. 1 is a block diagram showing a cleaning robot according to an embodiment of the present disclosure.

The following description merely illustrates a principle of the present disclosure. Therefore, those skilled in the art may implement the principle of the present disclosure and invent various devices included in the spirit and scope of the present disclosure although not clearly described or shown in the present specification. In addition, it is to be understood that all conditional terms and embodiments mentioned in the present specification are obviously intended only to allow those skilled in the art to understand a concept of the present disclosure in principle, and the present disclosure is not limited to the embodiments and states particularly mentioned as such.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented to perform the same function regardless of a structure.

Therefore, it is to be understood that, for example, block diagrams of the present specification illustrate a conceptual aspect of an illustrative circuit for embodying the principle of the present disclosure. Similarly, it is to be understood that all flow charts, state transition diagrams, pseudo-codes and the like, illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute appropriate software as well as dedicated hardware. When the functions are provided by the processors, the functions may be provided by a single dedicated processor, a single shared processor or a plurality of individual processors and some of them may be shared with each other.

In addition, terms mentioned as a processor, a control or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes or the like, and are coupled to appropriate circuits for executing the software to execute these functions. It is to be understood that functions provided by variously mentioned means are combined with each other and are combined with a method demanded by the claims in the present disclosure defined by the claims, and any means capable of providing these functions are thus equivalent to means recognized from the present specification.

The above-mentioned objects, features and advantages will become more obvious from the following detailed description associated with the accompanying drawings. Therefore, those skilled in the art to which the present disclosure pertains may easily practice a technical idea of the present disclosure. In addition, in describing the present disclosure, when it is decided that a detailed description for the known art related to the present disclosure may unnecessarily obscure the gist of the present disclosure, the detailed description thereof will be omitted.

Hereinafter, various embodiments of the present disclosure will be described in detail with reference to the accompanying drawings.

Figure 2:
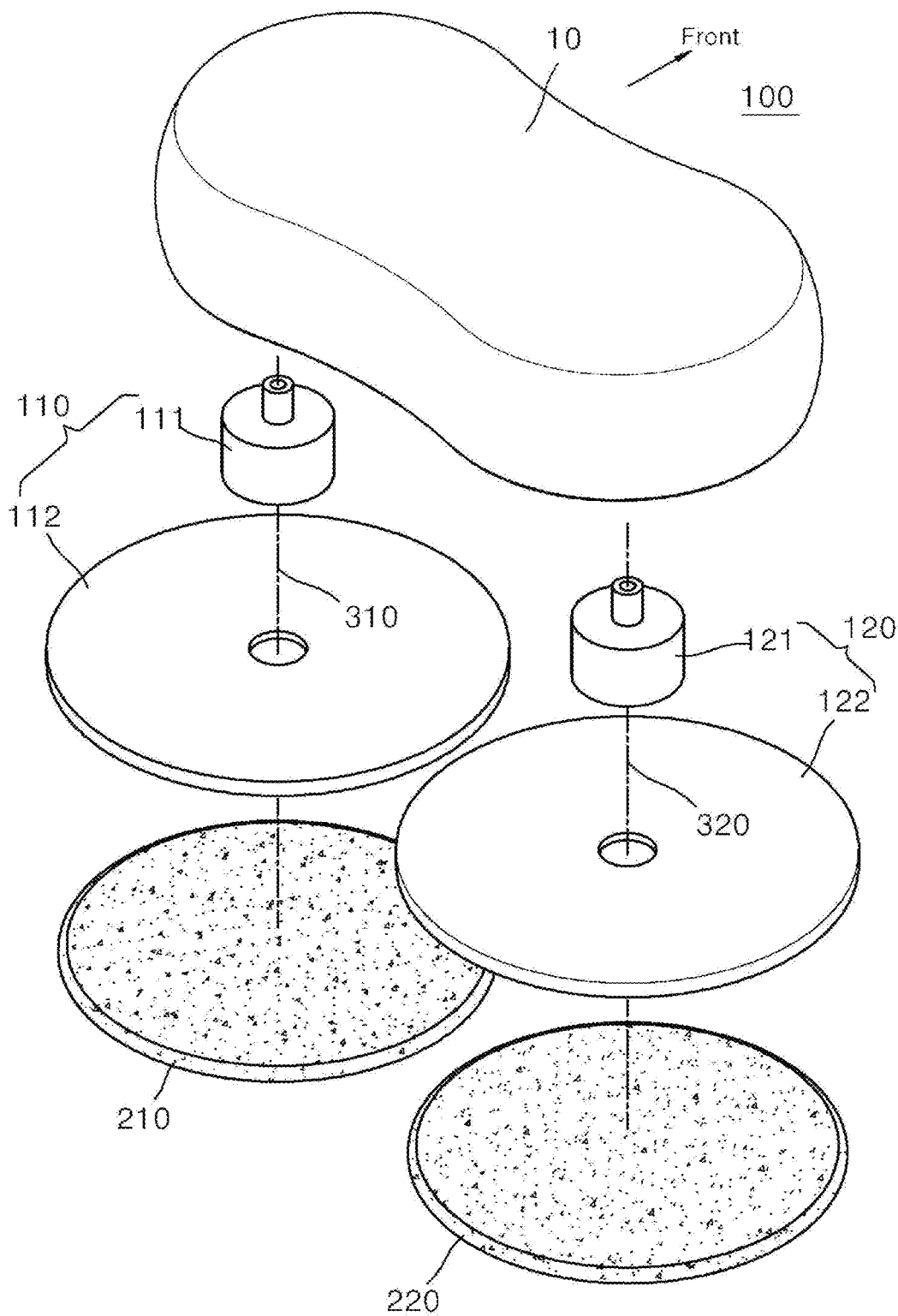
FIG. 2 is an exploded perspective view of the cleaning robot according to an embodiment of the present disclosure.
Figure 3:
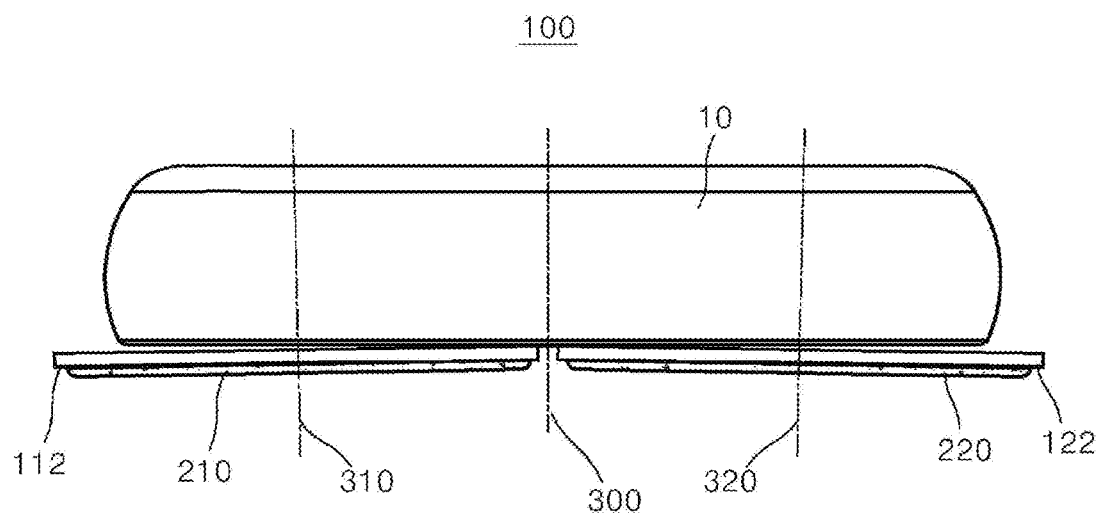
FIG. 3 is a front view of the cleaning robot according to an embodiment of the present disclosure.

FIGS. 1 to 3 are views for describing a structure of a cleaning robot according to an embodiment of the present disclosure. In more detail, FIG. 1 is a block diagram showing a cleaning robot according to an embodiment of the present disclosure; FIG. 2 is an exploded perspective view of the cleaning robot according to an embodiment of the present disclosure; and FIG. 3 is a front view of the cleaning robot according to an embodiment of the present disclosure.

Referring to FIGS. 1 to 3, a cleaning robot 100 according to the present disclosure includes: a first rotation member 110 and a second rotation member 120 each performing a rotational motion around a first rotation axis 310 and a second rotation axis 320; an acceleration detection unit 130 obtaining acceleration of the cleaning robot 100 during its driving; a rotational load detection unit 150 obtaining each rotational load of the rotation members 110 and 120; and a control unit 170. In addition, the cleaning robot 100 may further include components such as: a rotational speed detection unit 155 obtaining each rotational speed of the rotation members 110 and 120; a drive unit 200 supplying the cleaning robot with motive power for its driving; a communication unit 140 communicated with an external device; a storage unit 160 storing data; an input unit 180 receiving an operation mode from a user; an output unit 185 displaying a state of the cleaning robot 100 to the user; and a power supply unit 190 receiving power to drive the cleaning robot.

The drive unit 200 may include a first drive unit 201 installed in a body 10 and coupled to the first rotation member 110, and a second drive unit 202 installed in the body 10 and coupled to the second rotation member 120. Here, the drive unit 200 may be implemented including a motor, a gear assembly, etc.

The first rotation member 110 may include a first transmission member 111 coupled to the first drive unit 201 to transmit motive power by the first drive unit 201, and performing the rotational motion around the first rotation axis by the motive power. In addition, the first rotation member 110 may include a first fixing member 112 to which a first cleaner 210 for wet cleaning may be fixed.

In addition, the second rotation member 120 may include a second transmission member 121 coupled to the second drive unit 202 to transmit motive power by the second drive unit 202, and performing the rotational motion around the second rotation axis 320 by the motive power. In addition, the second rotation member 120 may include a second fixing member 122 to which a second cleaner 220 for the wet cleaning may be fixed. The cleaning robot 100 according to an embodiment may be driven while performing the wet cleaning using the cleaners 210 and 220 for the wet cleaning. Here, the wet cleaning may refer to cleaning performed by wiping a to-be-cleaned surface using the cleaners 210 and 220, and may include, for example, all the cleaning performed using a dry mop, a wet mop and the like. That is, the first cleaner 210 and the second cleaner 220 may each be made of a fibrous material such as a microfiber cloth, a mop, a non-woven cloth or a brush which may wipe various to-be-cleaned surfaces to remove a foreign material adhered to a floor surface through its rotational motion.

In general, most of the cleaning robots may each further include an external impact detection unit including a bumper protecting its body from external impact, a sensor detecting external impact applied to the bumper and the like to detect an obstacle during its driving. In addition, the cleaning robot having no bumper may have a separate image capture unit such as a camera to detect the obstacle through image analysis. However, the present disclosure may provide a method to effectively detect the obstacle even without having a separate bumper, external impact detection unit or image capture unit.

Figure 4:
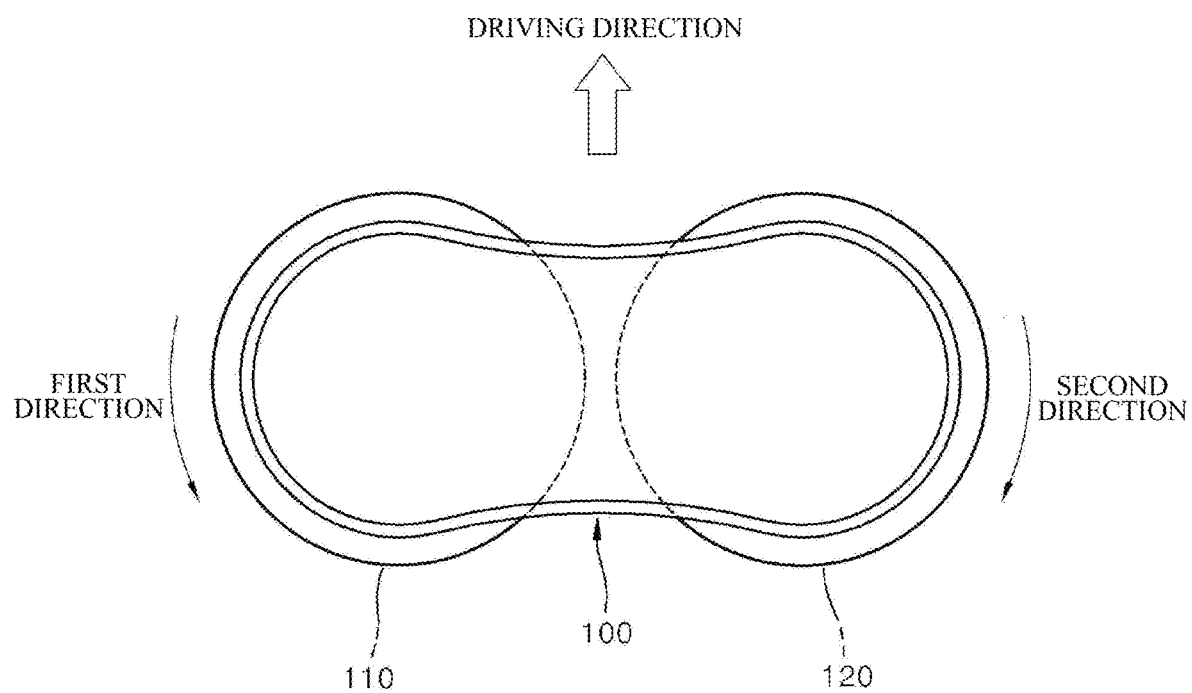
FIG. 4 is a view for describing a driving operation of the cleaning robot according to an embodiment of the present disclosure.

FIG. 4 is a view for describing a driving operation of the cleaning robot according to an embodiment of the present disclosure. As shown in FIG. 4, the cleaning robot 100 according to an embodiment of the present disclosure may remove the foreign material and the like adhered to a floor through friction between each of the cleaners and the to-be-cleaned surface as the first cleaner 210 and second cleaner 220 are rotated by the rotational motions of the first rotation member 110 and the second rotation member 120, respectively. In addition, a frictional force generated by the friction between each of the cleaners and the to-be-cleaned surface may be used as a motive power source of the cleaning robot 100.

In more detail, the moving speed and direction of the cleaning robot 100 according to an embodiment of the present disclosure may be adjusted depending on the magnitude and direction of a resultant force acting when the frictional force is generated between each of the cleaners and the to-be-cleaned surface as the first rotation member 110 and the second rotation member 120 are rotated, respectively.

In particular, referring to FIGS. 3 to 4, the first and second rotation axes 310 and 320 of the first and second rotation members 110 and 120 may each be inclined at a predetermined angle with respect to a central axis 300 corresponding to a vertical axis of the cleaning robot 100 by the motive power of a pair of drive units 201 and 202. In this case, the first and second rotation members 110 and 120 may be inclined downward toward the outside with respect to the central axis. That is, an area located far from the central axis 300 among the areas of the first and second rotation members 110 and 120 may be more closely adhered to the to-be-cleaned surface than an area located close to the central axis 300.

Here, the central axis 300 may refer to the axis of the cleaning robot 100 that is vertical with respect to the to-be-cleaned surface. For example, assuming that the cleaning robot 100 cleans an X-Y plane formed by X and Y axes during its cleaning, the central axis 300 may refer to a Z axis, which is the axis of the cleaning robot 100 that is vertical with respect to the to-be-cleaned surface.

Meanwhile, the predetermined angle may include a first angle (a degree) corresponding to an angle at which the first rotation axis 310 is inclined with respect to the central axis 300 and a second angle (b degree) corresponding to an angle at which the second rotation axis 320 is inclined with respect to the central axis 300. Here, the first angle and the second angle may be the same or different from each other.

In addition, each of the first angle and the second angle may preferably be an angle within an angular range of 1 degree or more and 3 degrees or less. Here, the above-described angular range may be a range in which the cleaning robot 100 may maintain its optimal wet cleaning capacity, driving speed and driving performance. However, various embodiments of the present disclosure may not be limited to the above-described angular range.

Meanwhile, depending on the predetermined angle, when the pair of rotation members 110 and 120 is rotated, the relative frictional force generated between each of the cleaners and the to-be-cleaned surface may be greater in an outer edge of the body 10 than in its center. Therefore, the moving speed and direction of the cleaning robot 100 may be controlled by the relative frictional force generated by respectively controlling the rotation of the pair of rotation members 110 and 120.

Meanwhile, when the cleaning robot 100 is driven by the above-described operation, the cleaning robot 100 may collide with various obstacles existing on the to-be-cleaned surface. Here, the obstacle may include various obstacles hindering the cleaning operation of the cleaning robot 100, such as a low obstacle such as a threshold or a carpet, an obstacle extending above at a predetermined height such as a sofa or a bed and a high obstacle such as a wall.

Figure 5:
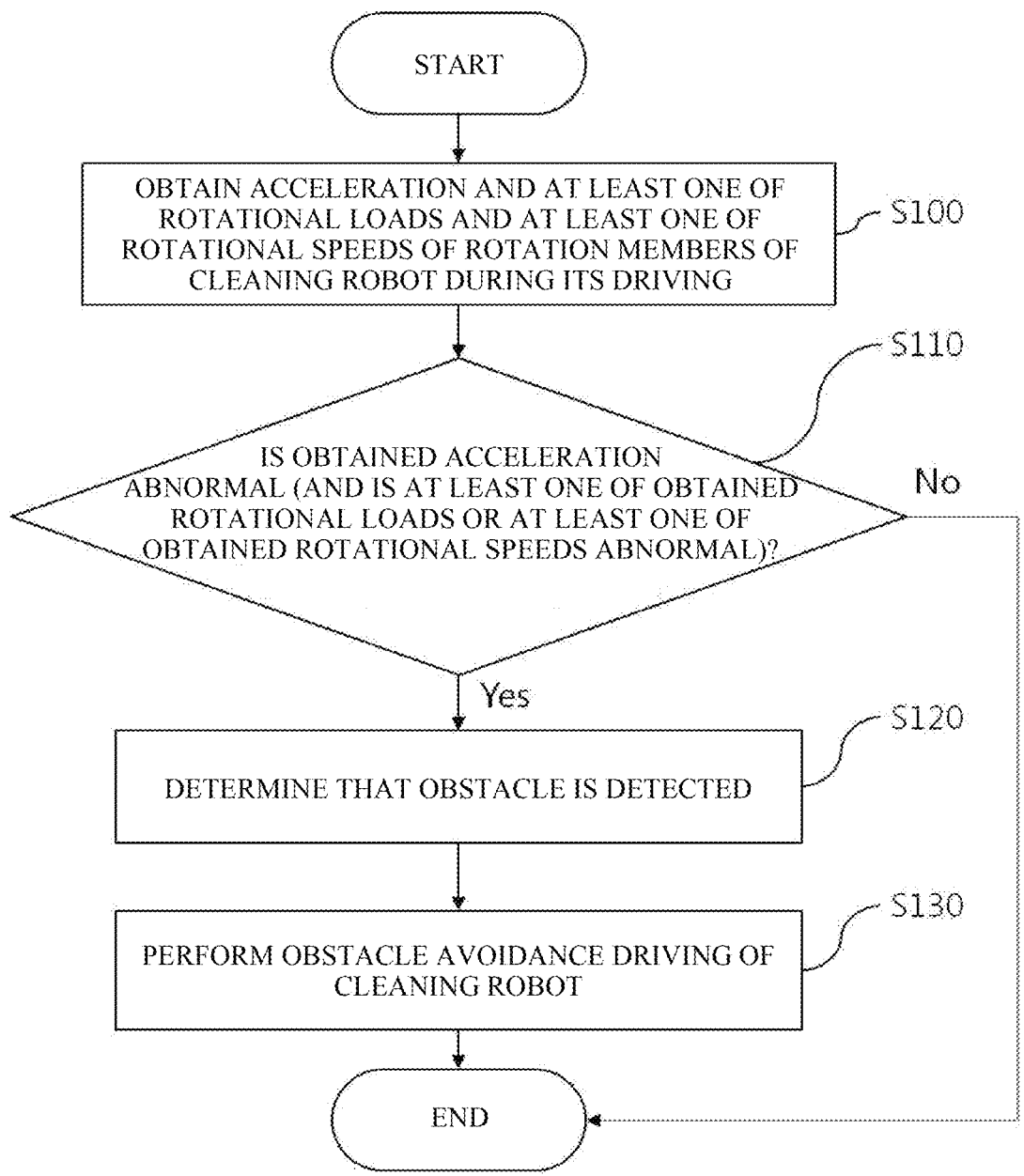
FIG. 5 is a flowchart showing a control method of the cleaning robot according to an embodiment of the present disclosure.

FIG. 5 is a flowchart showing a control method of the cleaning robot according to an embodiment of the present disclosure. As mentioned above, the cleaning robot 100 according to an embodiment of the present disclosure may provide the method to effectively detect the obstacle even without having a separate bumper, external impact detection unit or the image capture unit. As shown in FIG. 5, the obstacle detection may be achieved by a control method of the cleaning robot 100, including: obtaining at least one of respective rotational loads of the first and second rotation members 110 and 120 or at least one of respective rotational speeds of the first and second rotation members 110 and 120, and acceleration of the cleaning robot 100, during its driving (S100); determining whether the obtained acceleration is abnormal and whether at least one of the obtained rotational loads of the first and second rotation members 110 and 120 or at least one of the obtained rotational speeds of the first and second rotation members 110 and 120 is abnormal (S110); and determining that an obstacle is detected when the acceleration is determined to be abnormal and at least one of the rotational loads or at least one of the rotational speeds is determined to be abnormal (S120). Here, 'abnormal' may be used to refer to a case where a value is greater than or equal to a predetermined reference value, and therefore deviates from a range that may be determined as a normal driving state.

The rotational loads of the rotation members 110 and 120 may refer to the loads of physical forces applied thereto when the rotation members are rotated, respectively, and for example, the rotational load may be obtained based on a drive current applied to the aforementioned drive unit 200. In more detail, the rotation member may use a current value obtained from a drive power circuit of a motor included in the drive unit 200. The drive current may be useful information to obtain the rotational load necessary for the obstacle detection because the drive unit increases the drive current to obtain the rotational speed necessary for driving the cleaning robot 100 when there is a restriction on the rotations of the rotation members 110 and 120 due to the obstacle on a driving path of the cleaning robot 100. However, the rotational load of the present disclosure is not limited to being obtained based on the drive current, and may also be obtained by other means of measuring torque applied to the rotation axis, i.e. various means including a strain sensor for example.

The acceleration of the cleaning robot 100 during its driving may be obtained through an acceleration sensor for example. The acceleration sensor may refer to an electro-mechanical transducer generating electrical output using the principles of inertia force, electric deformation and gyro when mechanical impact or vibration is applied thereto. An acceleration value may be a factor representing an operating environment or operating state of a machine or instrument, and may thus be increasingly used in a robot, a mobile device, a wearable device, etc.

According to an embodiment of the present disclosure, it is possible to effectively improve obstacle detection performance by simultaneously considering the obtained acceleration and the rotational load. That is, when only the acceleration is considered, it is difficult to distinguish whether the acceleration is temporarily increased due to an irregular floor surface to be cleaned, or whether the cleaning robot 100 actually encounters the obstacle for which the cleaning robot 100 needs to stop its driving and perform an obstacle avoidance driving. In particular, the acceleration may be a factor reflecting a transient change in the motion of an object, and may thus return to 'zero' in a steady state after the change in a motion state. Therefore, based on only the acceleration, it is difficult to reliably detect a state in which the cleaning robot is unable to be driven any more due to the obstacle. Meanwhile, the rotational load may give a signal that there is a continuous problem with the rotation of the rotation member. However, it may be difficult to give a clear answer as to whether this problem occurs due to the obstacle to be avoided or this problem is only one element of a driving environment in which the cleaning robot needs to overcome and continue its driving. Therefore, it is possible to secure an effective and reliable obstacle detection performance by the control method according to an embodiment of the present disclosure in which the acceleration and the rotational load are simultaneously considered and the obstacle is determined to be detected only when both are determined to be abnormal. In addition, it is possible to detect the obstacle even without having a separate bumper or image capture unit, and this method may thus have an excellent effect in terms of product cost reduction.

In addition, the acceleration detection unit 130 may be of a type capable of detecting intensity of the acceleration, may determine whether at least one of the rotational loads and the obtained acceleration are abnormal by combining the intensity of the acceleration and that of the rotational load, and may determine that the obstacle is detected. For example, the acceleration detection unit 130 may determine that the obstacle is detected by detecting, as abnormal, all the cases in which the intensities of the acceleration and the rotational load are strong-weak, medium-medium and weak-strong, respectively. Through this detection, it is also possible to more precisely distinguish the following two cases from each other: there is no obstacle to the driving of the cleaning robot 100 even though momentary acceleration is detected large by momentary external impact; and the cleaning robot 100 needs to perform the obstacle avoidance driving even though the intensity of the acceleration is detected low because of a fixed obstacle made of a soft cushioning material.

The control method of the cleaning robot in an embodiment of the present disclosure may further include performing obstacle avoidance driving of the cleaning robot 100 when the obstacle is determined to be detected (S130). The obstacle avoidance driving of the cleaning robot 100 may be performed by restarting its driving to an area with no obstacle after leaving an area with the obstacle. The obstacle avoidance driving is described in detail below.

The above-described determining of whether the acceleration is abnormal and the rotation members are abnormal, i.e. the determining of whether at least one of the obtained rotational loads and the obtained acceleration are abnormal, may include determining whether the acceleration is abnormal by reflecting the driving environment of the cleaning robot. In more detail, the driving environment of the cleaning robot 100 such as the frictional force on the floor surface to be cleaned may not always be the same. That is, the driving environment may be different depending on a house or an indoor space, and the driving environment may be different depending on a location within the same indoor space. Therefore, when considering the acceleration of the cleaning robot, it is preferable to determine whether the acceleration is abnormal by reflecting the current driving environment.

The determining of whether the acceleration is abnormal by reflecting the driving environment may be achieved by reflecting the driving environment based on a change in the acceleration of the cleaning robot 100 during its driving. For example, the acceleration may be stored each time a predetermined time interval elapses during the driving of the cleaning robot 100, and the acceleration of the cleaning robot during its driving may be determined to be abnormal when the following deviation is greater than or equal to a predetermined first reference value: the deviation between the maximum and minimum values of the accelerations stored within a predetermined time period of the predetermined time interval or more, retroactively from a time point during the driving of the cleaning robot 100. That is, it is possible to reliably determine whether the acceleration is abnormal by using the difference between the maximum and minimum values of the acceleration within the predetermined time, i.e. the deviation, to determine whether the acceleration is abnormal despite the change in the driving environment affecting the acceleration of the cleaning robot 100 during its driving.

The predetermined time interval may be set to a time interval sufficient to indicate a change over time by storing data such as the acceleration, and for example, may be set to 20 msec. In addition, it is preferable to store more reliable data by using a low-pass filter to remove a high frequency noise component. The configuration of such a predetermined time interval and low-pass filter may be applied to storing data of the rotational speed and rotational load of the rotation member included in the present disclosure in addition to the acceleration.

In addition, the predetermined time period needs to be set to be greater than or equal to the predetermined time interval to secure at least two data to obtain the maximum and minimum values.

In addition, as an example of a data storage method, it is also possible to store data in a ring-buffer method using a circular queue. The circular queue may be a data structure, i.e. one of the structures in which data storage spaces are arranged, and a structure in which the last space is a starting point of the next queue by connecting the first and the last of the data storage spaces by stepping forward from a queue, i.e. a data structure allowing data to be inserted at one end and data to be retrieved from the other end. The ring-buffer may be a data storage means that enables efficient data storage and output by sending and retrieving data from the first space without moving data using such a circular queue. The maximum and minimum values of data stored in all or part of one ring-buffer may be read by utilizing such a ring-buffer. By this method, it may be easy to obtain the deviation between the maximum and minimum values of the accelerations stored within the predetermined time period of the predetermined time interval or more, retroactively from the time point during the driving of the cleaning robot 100. In this case, the predetermined time period may be time in which the data is stored in the all or part of the one ring-buffer.

The first reference value may be specified when the product is released from the factory based on the specification of the product. In addition, the control method of the cleaning robot according to an embodiment of the present disclosure may further include storing an average value of the deviation between the maximum and minimum values of the acceleration from the point in which the cleaning robot starts its driving to the point in which the cleaning robot is driven for a predetermined distance and setting a value greater than the average value as the first reference value. In this case, in the determining of whether the acceleration is abnormal and the rotation members are abnormal, the acceleration may be determined to be abnormal only when a state in which the deviation is greater than or equal to the first reference value is maintained for a predetermined duration or longer after the cleaning robot is driven for the predetermined distance.

For example, it is possible to store the average value of the deviation between the maximum and the minimum values of the acceleration, which are obtained by the acceleration sensor from the point in which the cleaning robot starts its driving to the point in which the cleaning robot is driven for 100 mm, and set a value greater than this average value, such as twice the average value, as the first reference value. In addition, whether the predetermined duration is maintained may be implemented by counting the number of times data is stored in a state in which the acceleration is greater than or equal to the first reference value at each predetermined time interval. When the deviation between the maximum and minimum values of the acceleration is maintained to be greater than or equal to the first reference value for the predetermined time period as described above, the acceleration may be determined to be abnormal, and its 'abnormal' category may thus exclude a case where the acceleration is high due to a temporary cause such as noise.

In addition, it is possible to independently and immediately determine that the acceleration of the cleaning robot 100 is abnormal when the acceleration is greater than or equal to a predetermined second reference value; alternatively, this determination method may also be performed parallel to the above described method of determining of whether the acceleration is abnormal when the acceleration is maintained to be greater than or equal to the first reference value for the predetermined time period. This embodiment is intended to cope with a case where a data value of the deviation is excessively peaked, and when these two determination methods are used in parallel, the second reference value may be set higher than the first reference value. For example, the second reference value may be set to 1.5 times the first reference value.

Meanwhile, the acceleration itself may be used to determine whether the acceleration is abnormal. That is, the acceleration may be determined to be abnormal also when the acceleration of the cleaning robot 100 during its driving is greater than or equal to a predetermined third reference value. The third reference value may be set to a value greater than the average value of the acceleration from the point in which the cleaning robot starts its driving to the point in which the cleaning robot is driven for a predetermined distance, for example, 100 mm, and may be set in the same manner as the second reference value, for example, twice the average value. In addition, the control method may be configured to exclude the case where the acceleration is high due to the temporary cause such as noise from its 'abnormal' category by determining that the acceleration is abnormal when the acceleration is maintained to be greater than or equal to the third reference value for the predetermined time period. In this case, it is also possible to determine that the acceleration of the cleaning robot 100 is abnormal when a data value of the acceleration is greater than or equal to a separate peak reference value in order to cope with a case where the data value of the acceleration is excessively peaked. When these two determination methods are used in parallel, the peak reference value may be set higher than the third reference value. For example, the peak reference value may be set to 1.5 times the third reference value.

According to an embodiment of the present disclosure, the acceleration may be given by a vector having x, y and z components that are spatially orthogonal in three directions, respectively. The vector may be obtained using a three-axis acceleration sensor. In this case, the first, second, third and peak reference values and the deviation between the maximum and minimum values of the acceleration may also be given by the vectors, and each vector component may match that of the acceleration in the same direction. That is, the x, y and z components of the above values may match the x, y and z components of the acceleration, respectively. When the acceleration is given by the vector as described above, whether the deviation between the maximum and minimum values of the acceleration is greater than or equal to the first reference value may be determined by whether at least one of respective vector components of the acceleration is greater than or equal to the matching vector component of the first reference value. This determination method may also be applied when comparing the deviation and the second reference value to each other, the acceleration and the third reference value to each other, and the acceleration and the peak reference value to each other.

As mentioned above, the rotational loads of the rotation members may be configured to be obtained based on the drive currents of the rotation members, respectively. In this case, the rotational load may be determined to be abnormal when the rotational load is greater than or equal to a predetermined rotational load reference value. The rotational load reference value may be set to a predetermined specific value when the product is released from the factory, and may be set to a value greater than an average value of the rotational load from the point in which the cleaning robot starts its driving to the point in which the cleaning robot is driven for a predetermined distance, for example, 100 mm, and for example, may be set to 1.3 times the average value.

In the determining of the obstacle detection, the rotational speed less than a fourth reference value may be determined to be abnormal. That is, more accurate obstacle detection may be achieved by including the rotational speed as a factor in determining whether the obstacle is detected in addition to the determining of whether the acceleration and the rotation members 110 and 120 are abnormal. In this case, the rotational speeds of the rotation members 110 and 120 may be obtained based on an output value of one of various types of rotational speed sensors provided thereto, an encoder for example. The fourth reference value may be set to a predetermined specific value when the product is released from the factory, and may be set to a value greater than the average value of the rotational load from the point in which the cleaning robot starts its driving to the point in which the cleaning robot is driven for a predetermined distance, for example, 100 mm, and for example, may be set to 1.5 times the average value.

Meanwhile, it may determine whether both the rotational speeds and rotational loads of the rotation members 110 and 120 are abnormal. That is, it may be determined that the obstacle is detected when satisfying the following: at least one of the rotational speeds of the rotation members 110 and 120 and at least one of the rotational loads of the rotation members 110 and 120 are both determined to be abnormal, and the acceleration of the cleaning robot is determined to be abnormal.

In this case, the rotational load reference value and the fourth reference value may be provided through a table that matches the rotational load versus the rotational speed in a designated normal driving environment. In addition, an encoder value E corresponding to the rotational speed may be used for the determination instead of the rotational speed, and a drive current value O of each of the rotation members 110 and 120 may be used as the rotational load. In this case, the table may be a table that matches an encoder value $E_t[speed]$ and a drive current value $O_t[Speed]$ in a normal driving environment.

In addition, the rotational load reference value and the fourth reference value may be obtained by mixing the rotational load and the rotational speed in the designated normal driving environment and a value set by the average value from the point in which the cleaning robot starts its driving to the point in which the cleaning robot is driven for a predetermined distance. In this case, for example, it is possible to determine whether the rotational load and the rotational speed are abnormal as follows.

When determined to be abnormal:

$$E_1 < E_t[speed] \text{ and } (O_1 \geq O_t[speed] \text{ or } O_1 \geq O_{avg} \times 1.3)$$

or, $$E_2 < E_t[speed] \text{ and } (O_2 \geq O_t[speed] \text{ or } O_1 \geq O_{avg} \times 1.3)$$

Here, $E_i$: encoder value of the i-th rotation member
$O_i$: drive current value of the i-th rotation member
$E_t[speed]$: encoder value in the normal driving environment
$O_t[speed]$: drive current value in the normal driving environment
$O_{avg}$: average value of the drive current from the point in which the cleaning robot starts its driving to the point in which the cleaning robot is driven for a predetermined distance In addition, the determining of the obstacle detection may further include determining whether a difference between the rotational speeds of the first and second rotation members 110 and 120 is greater than or equal to a predetermined fifth reference value and determining a position where the obstacle is detected based thereon. The fifth reference value may be set to a predetermined value reflecting a significant difference between the rotational speeds of the rotation members 110 and 120, and may be set to a value corresponding to five (5) based on the encoder value.

In particular, when the difference between the rotational speeds is greater than or equal to the fifth reference value, a position where a rotation member having a smaller rotational speed is located among the respective rotation members may be determined as the position where the obstacle is detected. That is, if the obstacle collides with a left rotation member based on a driving direction of the cleaning robot 100 during its driving, the rotational speed of the left rotation member may be decreased, and the rotational speed of a right rotation member with which the obstacle does not collide may be maintained or only slightly decreased. In this case, the position where the obstacle is detected may be 'left' based on the driving direction of the cleaning robot 100.

In the performing of the obstacle avoidance driving, when the position where the obstacle is detected is specified as described above, the cleaning robot may restart its driving biased in a direction of the other rotation member not located at the position where the obstacle is detected among the rotation members based on a direction in which the cleaning robot is driven before the obstacle is detected.

Figure 6:
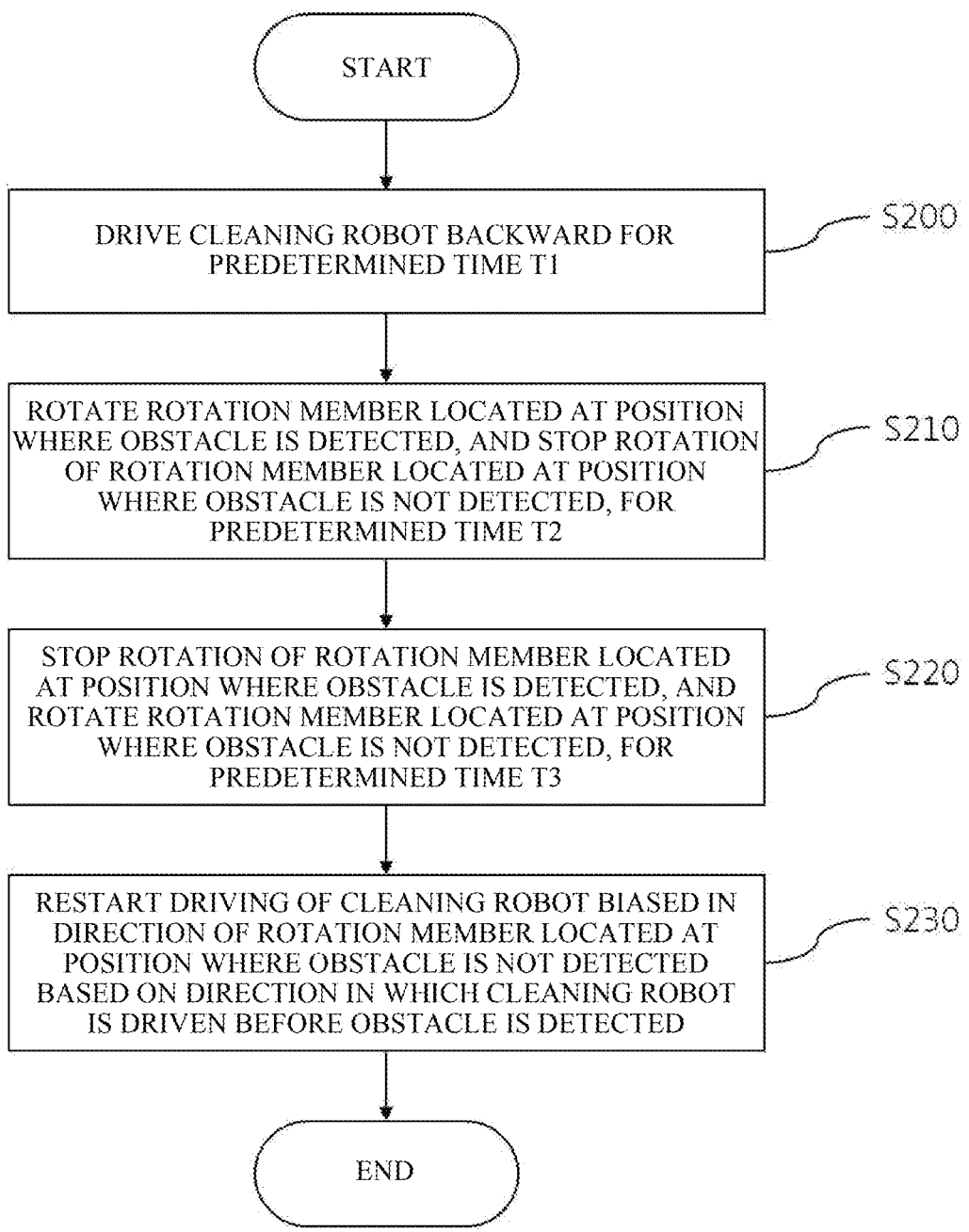
FIG. 6 is a flowchart showing a method of obstacle avoidance driving of the cleaning robot according to an embodiment of the present disclosure.
Figure 7:
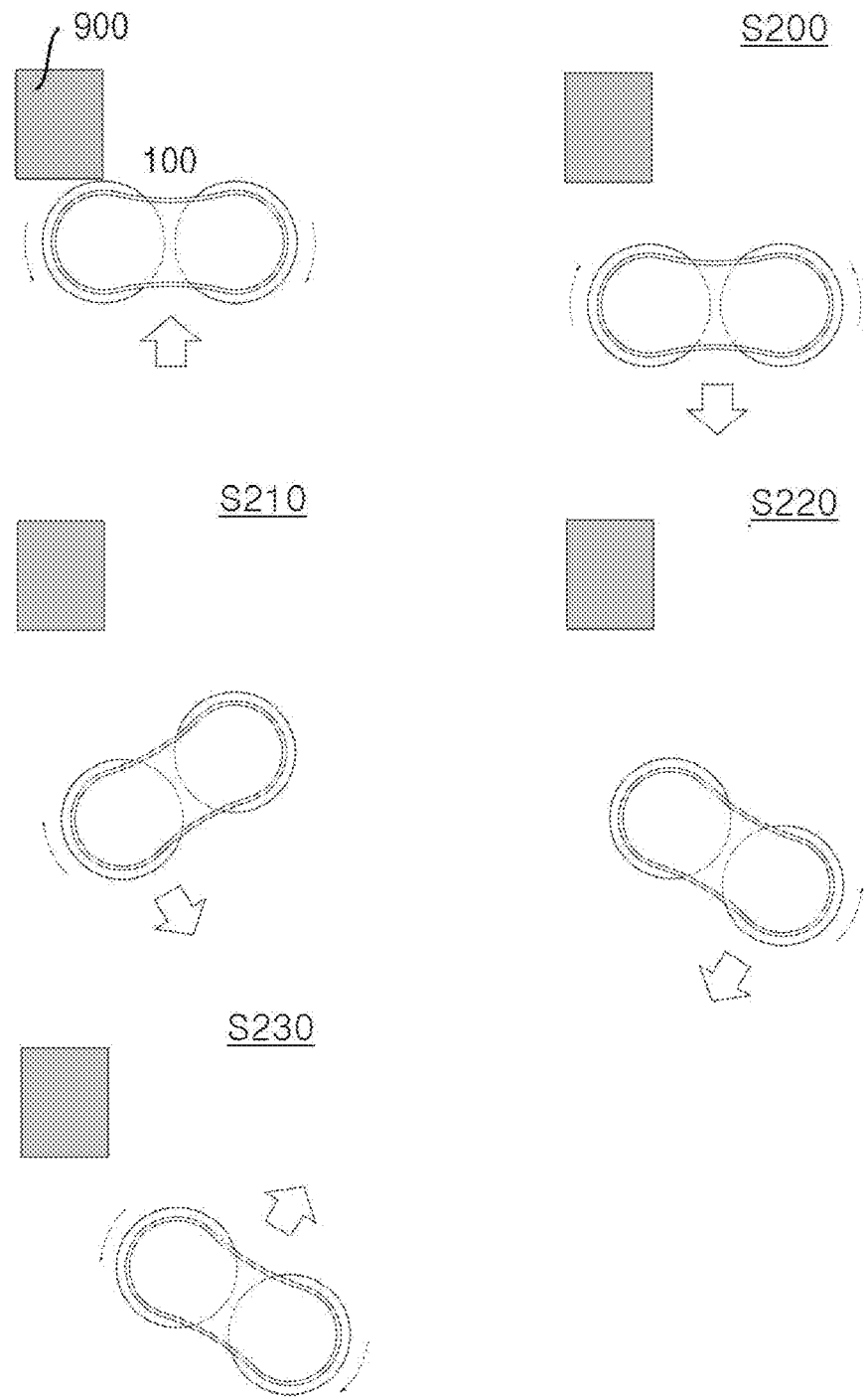
FIGS. 7 and 8 are views each showing the obstacle avoidance driving of the cleaning robot according to an embodiment of the present disclosure.

FIG. 6 is a flowchart showing a method of obstacle avoidance driving of the cleaning robot according to an embodiment of the present disclosure. FIG. 7 is a view showing the obstacle avoidance driving of the cleaning robot according to an embodiment of the present disclosure. As shown in FIGS. 6 and 7, according to the obstacle avoidance driving of the cleaning robot in an embodiment of the present disclosure, the cleaning robot may be driven backward in a direction opposite to its current driving direction for a predetermined time T1 (S200). Subsequently, the rotation member located at the position where the obstacle is detected may be rotated, and the rotation member located at the position where the obstacle is not detected may stop its rotation, for a predetermined time T2 (S210). Subsequently, the rotation member located at the position where the obstacle is detected may stop its rotation again, and the rotation member located at the position where the obstacle is not detected may be rotated, for a predetermined time T3 (S220). In this manner, the cleaning robot 100 may avoid an obstacle 900 and secure a space for its rotation, and then, restart its driving biased in a direction of the rotation member located at the position where the obstacle is not detected based on a direction in which the cleaning robot is driven before the obstacle is detected (S230).

Meanwhile, in the performing of the obstacle avoidance driving, when the difference between the rotational speeds is less than the fifth reference value, the cleaning robot may finally restart its driving in a direction opposite to the direction in which the cleaning robot is driven before the obstacle is detected.

Figure 8:
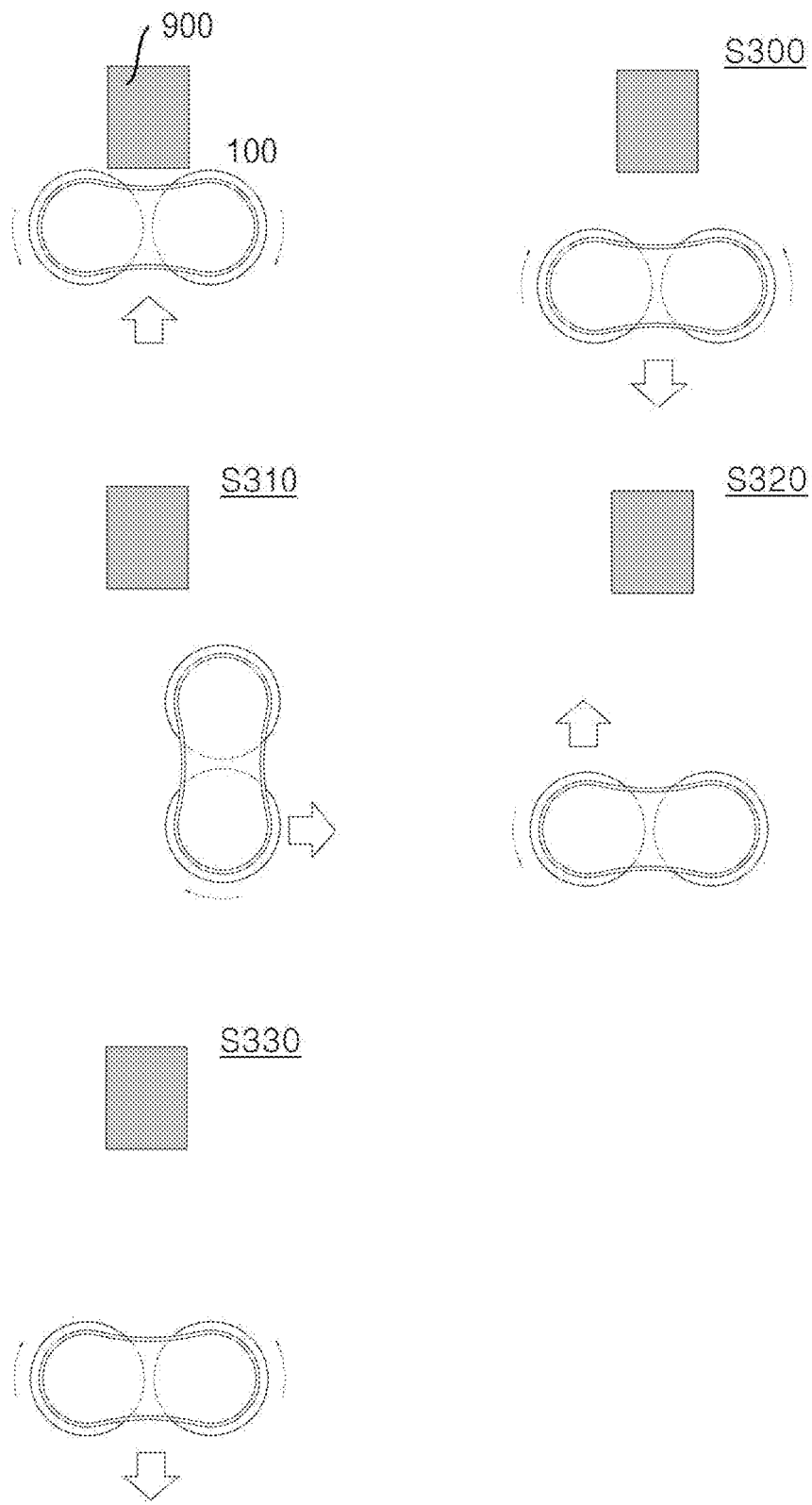

FIG. 8 is another view showing the obstacle avoidance driving of the cleaning robot according to an embodiment of the present disclosure. As shown in FIG. 8, according to the obstacle avoidance driving of the cleaning robot in an embodiment of the present disclosure, the cleaning robot may be driven backward in a direction opposite to its current driving direction for a predetermined time (S300). Subsequently, one of the rotation members 110 and 120 may stop its rotation, and the other rotation member may continue its rotation, for a predetermined time (S310). Subsequently, the one of the rotation members may be rotated again, and the other rotation member may stop its rotation, for a predetermined time (S320). In this manner, the cleaning robot 100 may avoid an obstacle 900 and secure a space for its rotation, and then, restart its driving in a direction opposite to a direction in which the cleaning robot is driven before the obstacle is detected (S330).

A cleaning robot 100 according to the present disclosure includes: a first rotation member 110 and a second rotation member 120 each performing a rotational motion around a first rotation axis 310 and a second rotation axis 320; an acceleration detection unit 130 obtaining acceleration of the cleaning robot 100 during its driving; a rotational load detection unit 150 obtaining each rotational load of the rotation members 110 and 120; and a control unit 170. In addition, the cleaning robot 100 may further include components such as: a rotational speed detection unit 155 obtaining each rotational speed of the rotating members 110 and 120; a drive unit 200 supplying motive power to drive the cleaning robot; a communication unit 140 communicated with an external device; a storage unit 160 storing data; an input unit 180 receiving an operation mode from a user; an output unit 185 displaying a state of the cleaning robot 100 to the user; and a power supply unit 190 receiving power to drive the cleaning robot.

The control unit 170 may determine that an obstacle is detected when the acceleration is determined to be abnormal and at least one of the rotational loads or at least one of the rotational speeds is determined to be abnormal by determining whether the obtained acceleration is abnormal and whether at least one of the obtained rotational loads of the first and second rotation members 110 and 120 or at least one of the obtained rotational speeds of the first and second rotation members 110 and 120 is abnormal (S110). Here, 'abnormal' may be used to refer to a case where a value is greater than or equal to a predetermined reference value, and therefore deviates from a range that may be determined as a normal driving state.

The rotational loads of the rotation members 110 and 120 may refer to the loads of physical forces applied thereto when the rotation members are rotated, respectively, and for example, the rotational load may be obtained based on a drive current for the rotation of the rotation members 110 and 120. In more detail, the cleaning robot 100 may include the drive units of the rotation members 110 and 120, and the rotation member may use a current value obtained from a drive power circuit of a motor included in the drive unit. The drive current may be useful information to obtain the rotational load necessary for the obstacle detection because the drive unit increases the drive current to obtain the rotational speed necessary for driving the cleaning robot 100 when there is a restriction on the rotations of the rotation members 110 and 120 due to the obstacle on a driving path of the cleaning robot 100.

The acceleration of the cleaning robot 100 during its driving may be obtained through an acceleration sensor for example. The acceleration sensor may refer to an electromechanical transducer generating electrical output using the principles of inertia force, electric deformation and gyro when mechanical impact or vibration is applied thereto.

When the obstacle is determined to be detected, the control unit 170 of the cleaning robot 100 may allow the cleaning robot 100 to perform obstacle avoidance driving. The cleaning robot 100 may perform the obstacle avoidance driving by restarting its driving to an area with no obstacle after leaving an area with the obstacle.

The control unit 170 may determine whether the acceleration is abnormal by reflecting a driving environment of the cleaning robot 100. The driving environment of the cleaning robot 100 such as the frictional force on the floor surface to be cleaned may not always be the same. Therefore, when considering the acceleration of the cleaning robot 100, it is preferable to determine whether the acceleration is abnormal by reflecting the driving environment.

In particular, the control unit 170 may reflect the driving environment based on a change in the acceleration of the cleaning robot 100 during its driving. For example, the control unit 170 may allow the acceleration to be stored each time a predetermined time interval elapses during the driving of the cleaning robot 100, and may determine that the acceleration of the cleaning robot during its driving is abnormal when the following deviation is greater than or equal to a predetermined first reference value: the deviation between the maximum and minimum values of the accelerations stored within a predetermined time period of the predetermined time interval or more, retroactively from a time point during the driving of the cleaning robot 100. That is, it is possible to reliably determine whether the acceleration is abnormal by using the difference between the maximum and minimum values of the acceleration within the predetermined time, i.e. the deviation, to determine whether the acceleration is abnormal despite the change in the driving environment affecting the acceleration of the cleaning robot 100 during its driving.

The cleaning robot 100 may include first and second rotational speed detection units 156 and 157 obtaining the rotational speeds of the rotation members 110 and 120, respectively. In this case, the control unit 170 may determine that the rotational speed less than a fourth reference value among the obtained rotational speeds is abnormal. That is, more accurate obstacle detection may be achieved by including the rotational speed as a factor in determining whether the obstacle is detected in addition to the determining of whether the acceleration and the rotation members 110 and 120 are abnormal. In this case, the rotational speeds of the rotation members 110 and 120 may be obtained based on an output value of one of various types of rotational speed sensors provided thereto, an encoder for example. The fourth reference value may be set to a predetermined specific value when the product is released from the factory, and may be set to a value greater than the average value of the rotational load from the point in which the cleaning robot starts its driving to the point in which the cleaning robot is driven for a predetermined distance, for example, 100 mm, and may be set to 1.5 times the average value for example.

In addition, the control unit 170 may determine whether a difference between the rotational speeds of the first and second rotation members 110 and 120 is greater than or equal to a predetermined fifth reference value and determine a position where the obstacle is detected based thereon. The fifth reference value may be set to a predetermined value reflecting a significant difference between the rotational speeds of the rotation members 110 and 120, and may be set to a value corresponding to five (5) based on the encoder value.

Meanwhile, the control method according to various embodiments of the present disclosure described above may be implemented by a program code and be provided in the respective servers or apparatuses in a state in which it is stored in various non-transitory computer readable medium.

The non-transitory computer readable medium is not a medium that stores data therein for a while, such as a register, a cache, a memory or the like, but a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a blu-ray disk, a universal serial bus (USB), a memory card, a read only memory (ROM) or the like.

In addition, although the embodiments of the present disclosure have been illustrated and described hereinabove, the present disclosure is not limited to the above-mentioned specific embodiments, but may be variously modified by those skilled in the art to which the present disclosure pertains without departing from the scope and spirit of the present disclosure as disclosed in the accompanying claims. These modifications should also be understood to fall within the scope of the present disclosure.

The invention claimed is:

1. A control method of a cleaning robot including a first rotation member and a second rotation member each performing a rotational motion around a first rotation axis and a second rotation axis, respectively, the control method comprising:
obtaining acceleration of the cleaning robot and at least one of respective rotational loads of the first and second rotation members or at least one of respective rotational speeds of the first and second rotation members, during driving of the cleaning robot;
determining whether the obtained acceleration is abnormal and whether at least one of the obtained rotational loads or at least one of the obtained rotational speeds is abnormal; and
determining that an obstacle is detected when the acceleration is determined to be abnormal and at least one of the rotational loads or at least one of the rotational speeds is determined to be abnormal,
wherein the determining of whether the acceleration is abnormal includes determining whether the acceleration is abnormal by reflecting a driving environment of the cleaning robot, and the driving environment is reflected based on a change in the acceleration of the cleaning robot during the driving,
wherein in the determining of whether the acceleration is abnormal by reflecting the driving environment, the acceleration is stored each time a predetermined time interval elapses during the driving of the cleaning robot, and the acceleration of the cleaning robot during its driving is determined to be abnormal when the following deviation is greater than or equal to a predetermined first reference value: the deviation between maximum and minimum values of the accelerations stored within a predetermined time period of the predetermined time interval or more, retroactively from a time point during the driving of the cleaning robot,
wherein each of the acceleration and the predetermined first reference value is provided as a vector having x, y and z components orthogonal in three directions, respectively, the vector components in the same direction matching each other, and
wherein whether the deviation between the maximum and minimum values of the acceleration is greater than or equal to the predetermined first reference value is determined by whether at least one of respective vector components of the acceleration is greater than or equal to the matching vector component of the predetermined first reference value.

2. The control method of a cleaning robot of claim 1, further comprising performing obstacle avoidance driving of the cleaning robot when the obstacle is determined to be detected.

3. A control method of a cleaning robot including a first rotation member and a second rotation member each performing a rotational motion around a first rotation axis and a second rotation axis, respectively, the control method comprising:
obtaining acceleration of the cleaning robot and at least one of respective rotational loads of the first and second rotation members or at least one of respective rotational speeds of the first and second rotation members, during driving of the cleaning robot;
determining whether the obtained acceleration is abnormal and whether at least one of the obtained rotational loads or at least one of the obtained rotational speeds is abnormal; and
determining that an obstacle is detected when the acceleration is determined to be abnormal and at least one of the rotational loads or at least one of the rotational speeds is determined to be abnormal,
wherein the determining of whether the acceleration is abnormal includes determining whether the acceleration is abnormal by reflecting a driving environment of the cleaning robot, and the driving environment is reflected based on a change in the acceleration of the cleaning robot during the driving,
wherein in the determining of whether the acceleration is abnormal by reflecting the driving environment, the acceleration is stored each time a predetermined time interval elapses during the driving of the cleaning robot, and the acceleration of the cleaning robot during its driving is determined to be abnormal when the following deviation is greater than or equal to a predetermined first reference value: the deviation between maximum and minimum values of the accelerations stored within a predetermined time period of the predetermined time interval or more, retroactively from a time point during the driving of the cleaning robot,
wherein the control method further comprises, storing an average value of the deviation from a point in which the cleaning robot starts the driving to a point in which the cleaning robot is driven for a predetermined distance and setting a value greater than the average value as the predetermined first reference value, and
wherein in the determining of whether the acceleration is abnormal, the acceleration is determined to be abnormal only when a state in which the deviation is greater than or equal to the predetermined first reference value is maintained for a predetermined duration or longer after the cleaning robot is driven for the predetermined distance.

4. The control method of a cleaning robot of claim 1, wherein in the determining of whether the acceleration is abnormal, the acceleration of the cleaning robot during its driving is determined to be abnormal when the deviation is greater than or equal to a predetermined second reference value, and wherein the predetermined second reference value is higher than the predetermined first reference value.

5. The control method of a cleaning robot of claim 4, wherein in the determining of whether the acceleration is abnormal, the acceleration of the cleaning robot during its driving is determined to be abnormal also when the acceleration is greater than or equal to a predetermined third reference value.

6. The control method of a cleaning robot of claim 1, wherein the rotational loads of the rotation members are obtained based on respective drive currents of the rotation members.

7. The control method of a cleaning robot of claim 2, wherein in the determining of whether the rotational loads or the rotational speeds of the rotation members are abnormal, the rotational speed less than a predetermined second reference value is determined to be abnormal.

8. The control method of a cleaning robot of claim 7, wherein the determining of the obstacle detection further includes determining whether a difference between the rotational speeds of the first and second rotation members is greater than or equal to a predetermined fifth third reference value and determining a position where the obstacle is detected based thereon.

9. A control method of a cleaning robot including a first rotation member and a second rotation member each performing a rotational motion around a first rotation axis and a second rotation axis, respectively, the control method comprising:
 obtaining acceleration of the cleaning robot and at least one of respective rotational loads of the first and second rotation members or at least one of respective rotational speeds of the first and second rotation members, during driving of the cleaning robot;
 determining whether the obtained acceleration is abnormal and whether at least one of the obtained rotational loads or at least one of the obtained rotational speeds is abnormal;
 determining that an obstacle is detected when the acceleration is determined to be abnormal and at least one of the rotational loads or at least one of the rotational speeds is determined to be abnormal; and
 performing obstacle avoidance driving of the cleaning robot when the obstacle is determined to be detected,
 wherein in the determining of whether the rotational loads or the rotational speeds of the rotation members are abnormal, the rotational speed less than a predetermined first reference value is determined to be abnormal,
 wherein the determining of the obstacle detection further includes determining whether a difference between the rotational speeds of the first and second rotation members is greater than or equal to a predetermined second reference value and determining a position where the obstacle is detected based thereon,
 wherein in the determining of the position where the obstacle is detected, when the difference between the rotational speeds is greater than or equal to a third reference value, a position where a rotation member having a smaller rotational speed is located among the respective rotation members is determined as the position where the obstacle is detected, and
 wherein in the performing of the obstacle avoidance driving, the cleaning robot restarts its driving biased in a direction of the other rotation member not located at the position where the obstacle is detected among the rotation members based on a direction in which the cleaning robot is driven before the obstacle is detected.

10. The control method of a cleaning robot of claim 8, wherein in the performing of the obstacle avoidance driving, when the difference between the rotational speeds is less than the predetermined third reference value, the cleaning robot restarts the driving in a direction opposite to a direction in which the cleaning robot is driven before the obstacle is detected.

11. The control method of a cleaning robot of claim 2, wherein cleaners for wet cleaning are fixed to the first rotation member and the second rotation member, respectively, and the cleaning robot is driven using a frictional force as its motive power source, the frictional force being generated between a to-be-cleaned surface and each of the fixed cleaners as the each of the fixed cleaners performs the rotational motion.

12. The control method of a cleaning robot of claim 3, wherein in the determining of whether the acceleration is abnormal and the rotation members are abnormal, the acceleration of the cleaning robot during its driving is determined to be abnormal when the deviation is greater than or equal to a predetermined second reference value, and wherein the predetermined second reference value is higher than the predetermined first reference value.

13. The control method of a cleaning robot of claim 1, wherein in the determining of whether the acceleration is abnormal and the rotation members are abnormal, the acceleration of the cleaning robot during its driving is determined to be abnormal also when the acceleration is greater than or equal to a predetermined second reference value.

* * * * *